United States Patent Office 3,342,715
Patented Sept. 19, 1967

3,342,715
METHOD OF MANUFACTURING GASEOUS HYDRIDES IN ADJUSTABLE AMOUNTS, METHOD OF USING SUCH HYDRIDES AND DEVICE FOR CARRYING OUT SUCH METHODS
Jean-Jacques Brissot and Héliette Raynaud, Paris, France, assignors to North American Philips Company, Inc., New York, N.Y., a corporation of Delaware
Filed Feb. 14, 1962, Ser. No. 173,200
Claims priority, application France, Feb. 15, 1961, 852,812
5 Claims. (Cl. 204—164)

This invention relates to methods of manufacturing gaseous compounds in adjustable amounts by reaction of a gas with a solid, liquid, or gaseous substance. It also relates to methods of using such gaseous compounds and devices for carrying out the above-mentioned methods.

Many gaseous chemical compounds such as, for example, volatile hydrides may be obtained in an adjustable and regular manner by conventional methods with difficulty only and an object of the present invention is inter alia to provide for this purpose a novel method of manufacturing gaseous compounds.

With reactions between a gas and a solid, liquid, or gaseous substance while forming a gaseous compound it is possible to distinguish between exothermal and endothermal reactions. In exothermal reactions, that is to say those in which heat is evolved, a certain initial temperature is required for the reaction. When the reaction has set in it will cause a rise in temperature whereby the reaction is liable to be speeded up so that the risk of an explosion is to be feared. The reaction temperature must therefore be maintained by means of suitable cooling, the temperature not being allowed to drop so that the reaction discontinues. In this kind of reaction the yield cannot usually be adjusted arbitrarily and will frequently fluctuate. Endothermal reactions, in which heat must be taken up from the surroundings, usually require to use of very high temperatures and continuous supply of heat. In these reactions also the yield is adjustable with difficulty only.

The present invention makes use of the fact that such reactions may take place at much lower temperatures, or are possible altogether if at least one of the substances participating in the reaction is activated.

According to the invention, in a method of manufacturing a gaseous chemical compound by reaction of a gas with a solid, liquid, or gaseous substance, the gas is pre-activated and then brought into contact with the substance, the extent of the activation of the gas being controlled on contacting. The pre-activation may be effected, for example, by means of high-energy radiation, for example X-ray radiation, the intensity of the radiation striking the gas determining the extent of activation. The pre-activation is preferably effected by means of electric discharge and may be controlled, for example, by means of the current strength and/or the distance between the electrodes.

Once the gas having been activated, it tends to return gradually to the inactivated state. Use may be made of this fact to control the period needed by the gas to flow from the place of activation to the place of contact, referred to hereinafter as "reaction place." To this end, the rate of flow of the gas may be made adjustable. The higher the rate of flow, the less the decrease in activation. For example when using an electric discharge, the number of gas molecules ionized per unit-time is independent of the rate of flow, it is true, but since the volume of the flowing gas per unit-time is higher, an increase in the rate of flow of the gas results in a greater dilution of the gaseous compound, formed by the reaction in the gas. The distance between the place of activation, for example in between the electrodes when using discharge, and the reaction place is preferably adjusted, while the rate of flow may be maintained constant.

The present invention is suited more particularly for obtaining gaseous hydrides. Such hydrides cannot usually be manufactured from the elements directly. According to the invention, the hydrides may not only be obtained from the elements directly, but also in adjustable amounts. The method according to the invention is especially important for manufacturing hydrides of elements used in the semi-conductor technique, for example as a semi-conductor element or as a dope for a semi-conductor. Thus, hydrides of phosphorus, arsenic, antimony, boron, sulphur, selenium, silicon and germanium may be manufactured in this manner in adjustable amounts, for example directly by reaction of activated hydrogen gas with the said elements. As is well-known, phosphorus, arsenic, antimony and boron are suitable activating materials for the semi-conductor elements germanium and silicon, and sulphur and selenium are activating substances for semi-conductive compounds of type $A^{III}B^V$ wherein $A^{III}$ may be aluminium, gallium or indium and $B^V$ may be phosphorus, arsenic or antimony. Selenium, silicon and germanium are semi-conductor elements.

The invention also relates to a device for carrying out the method according to the invention. The device concerned comprises a vessel with an inlet and outlet for a gas flow, means for introducing and discharging gas into and from the vessel, electrodes for activating the introduced gas and means for providing or introducing a substance for reaction with the activated gas at an area in the vessel situated in the path of the gas between the electrodes and the gas outlet, it being possible to adjust the distance between the electrodes, on the one hand, and the place of the provision or introduction of the material, on the other. If the substance is a solid material a porous carrier therefor is preferably placed between the electrodes and the gas outlet. For using a liquid substance, the device may comprise within the vessel a container for the liquid substance, the path of the gas between the inlet and outlet extending either along, or through the container. For using a gaseous material, a second inlet may be provided in the vessel situated in the path of the gas between the electrodes and the outlet.

According to a further feature of the invention, the gaseous compound produced is for direct use. To this end, the device according to the invention may be connected through the gas outlet to a device for direct use of the gaseous compound produced in the vessel.

The invention is especially suited for use in manufacturing semi-conductor arrangements. According to the invention, for example phosphorus hydride, arsenic hydride, antimony hydride or boron hydride may be manufactured in adjustable amounts and used directly for activating germanium or silicon with phosphorus, arsenic, antimony or boron. The hydrides of sulphur or selenium may be used in a similar manner for activating a semi-conductor of type $A^{III}B^V$, as mentioned above. The hydrides may in this case readily be dissociated by heating. The activation may be effected by dissolving the activating substance in molten semi-conductors, for example in the known method of manufacturing activated semi-conductor bodies from a melt, such as by zone melting, or by crystal growth by pulling up a crystal from the melt. The activation may alternatively be effected by diffusion into a heated solid semi-conductor body, an activated semi-conductor layer being formed at the surface of the body by diffusion of the activating substance. The above-mentioned activating methods are known per se and are used, for example, in the manufacture of semi-conductor devices such as crystal diodes, transistors and photo-electric cells. Devices for pulling up crystals from a melt for zone melting, for example in a crucible or by the floating zone method, and for diffusing an impurity into semi-conductor bodies are known per se. A device comprising a closed vessel having an inlet and an outlet for gas is preferably connected through its inlet to the gas outlet of a device according to the invention for manufacturing a gaseous compound.

Furthermore, according to the invention, hydrides of selenium, germanium or silicon may be obtained in adjustable amounts and used directly for producing a semi-conductor layer on a carrier. The carrier may also be in known manner a semi-conductor body made, for example, of a material similar to that of the layer to be manufactured. The carrier is heated and the hydride dissociated upon contacting the carrier, resulting in a semi-conductor layer growing on the surface of the carrier having a thickness which may be adjusted by controlling the period of growing and the activation in the method according to the invention for manufacturing the hydride. The device according to the invention for manufacturing the gaseous compound may be connected through its gas outlet to a gas inlet of a device for manufacturing semi-conductor layers by dissociation of gaseous compounds of a semi-conductor material. Devices of the last-mentioned kind are known per se.

In order that the invention may be readily carried into effect, it will now be described in detail, by way of example, with reference to the accompanying diagrammatic drawings, in which.

The relevant device is described more particularly for the manufacture and use of phosphine $PH_3$, for example for activating silicon crystals to form n-type semi-conductors. However, further volatile hydrides and also further chemical compounds may also be manufactured with the same device or at least with other devices based on the same principle of activation by electric discharge of the reaction gas, that is to say with devices which are likewise within the scope of the invention.

Figure 1:
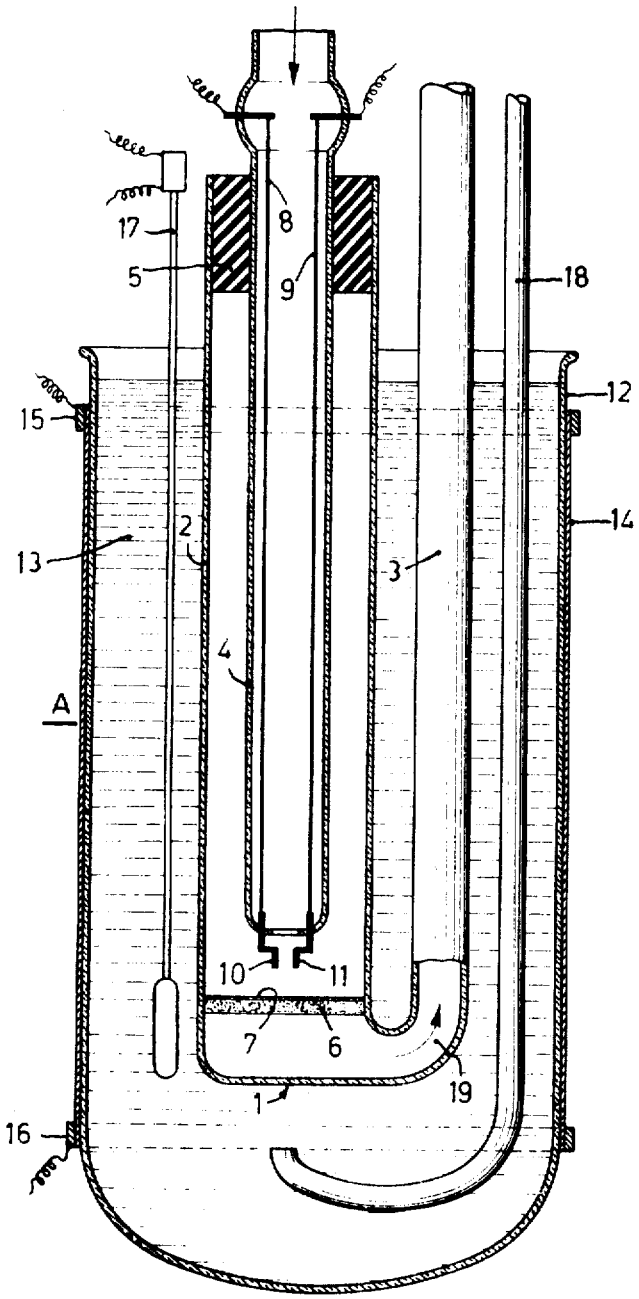
FIGURE 1 shows a device for carrying out the method according to the invention.

The device designated A (see FIGURE 1) comprises a U-shaped tube 1 having a limb 2 into which a further tube 4 is introduced so as to be movable therein in the axial direction, a stopper 5 closing the space between the two tubes.

The tube 1 comprises, below tube 4, a porous carrier plate of sintered glass, on which a thin layer of pulverulent phosphorus 7, preferably red phosphorus, is provided.

Within tube 4 are two electrical current supply leads 8 and 9 connected at their ends to two tungsten electrodes 10 and 11.

The tubes 1 and 4 are housed in a container 12 which is filled with a thermostatic liquid 13 and covered, between two electrodes 15 and 16, with a translucent and conductive tin-oxide deposit 14. The electrodes are connected to an electric current source (not shown) heating the liquid 13 and the tubes 1 and 4 to a suitable temperature, independent of the surroundings, and maintaining it at this temperature by control of a contact thermometer 17, connected in series with the said source. The thermostatic device also includes a stirrer 18 producing bubbles.

Figure 2:
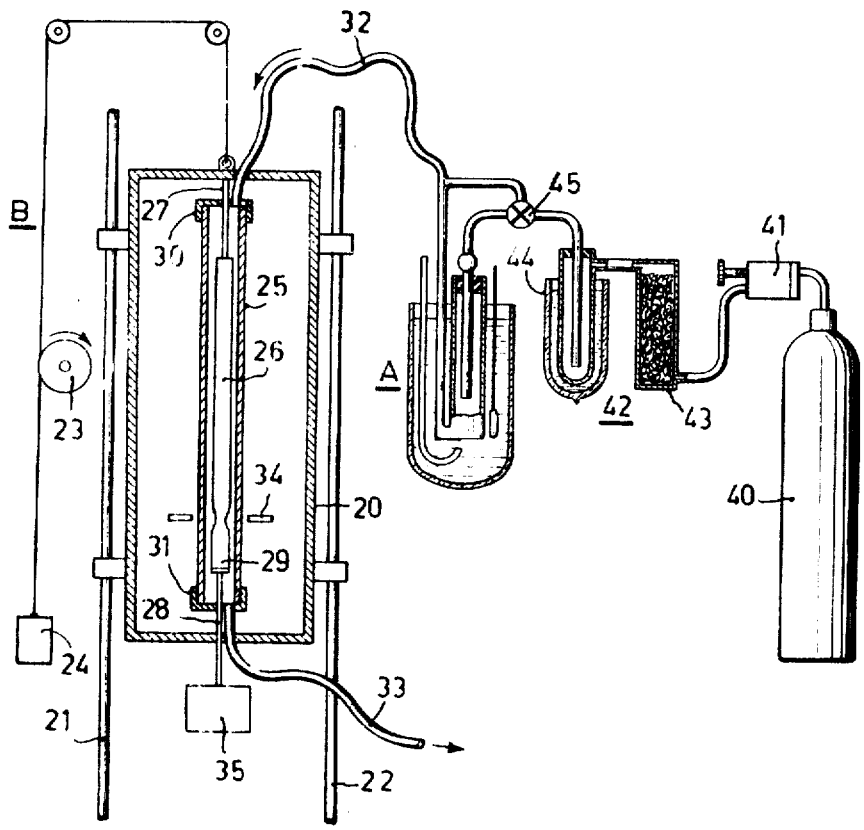
FIGURE 2 shows an arrangement comprising a device as shown in FIGURE 1 for a special use of the invention.

The other limb 3 of the U-shaped tube communicates with a known device, designated B in FIGURE 2, in which for example silicon may be treated by so-called floating zone-melting for obtaining doped monocrystals of silicon. This method permits in a regular manner an activation from the gaseous phase.

The device B, shown in FIGURE 2 on a larger scale than the remaining part of the device for the sake of clarity, comprises a supporting frame 20, which can be moved in a vertical direction along two guide rods 21 and 22 by means of an electric motor 23 and a counterweight 24, for example at a rate of 1 mm. to 2 mm. per minute. The frame 20 supports a quartz tube 25 containing a silicon rod 26 to be activated, which is supported by two holders 27 and 28, the latter through the intermediary of a silicon crystal 29 which serves as a seed crystal for producing at the same time a single crystal upon activation. The holder 28 when driven by an electric motor 35, can rotate in a stopper 31 of the quartz tube, for example at a rate of 100 revolutions per minute. The stoppers 30 and 31 have apertures to which tubings 32 and 33 are connected. The device B also includes a fixed flat coil 34 which is fed with high-frequency current through leads (not shown) and within which the quartz tube 25 and the silicon rod 26 can be moved as a result of the vertical movement of the frame 20.

The device B for floating zone-melting operates as follows. The frame is designed so that the connection between silicon rod 26 and crystal 29 is within the coil 34.

When high-frequency current is supplied to coil 34 a drop-like molten zone of the silicon is formed therein which is in contact with the gaseous mixture emerging from tubing 32 and containing the impurity required for doping the silicon, or a compound thereof, said impurity being dissociated at the temperatures in the heated zone.

The electric motors 23 and 35 start rotating simultaneously. The inoculating crystal 29 connected to holder 28 is thus rotated whereas the silicon rod 26 located above the molten zone remains at rest. At the same time the frame 20 and all that is supported by it moves downwards at a constant speed chosen between 1 mm. and 2 mm. per minute, for example 1.5 mm. per minute. Since coil 34 remains immovable, the molten zone remaining always centered within it, moves to the upper end of the rod and is doped by the impurity contained in the gas.

Th whole of the silicon rod is thus gradually doped and exhibits the crystal structure of the seed crystal 29. In doping with phosphorus, phosphorus hydride ($PH_3$), also known under the name "phosphine," is a suitable gaseous compound for providing the phosphorus. Phosphine may be manufactured by means of the device A, as mentioned hereinbefore, and may be supplied to the device B immediately after being formed.

During operation of device A a gas flow of molecular hydrogen $H_2$ emerges from a flask 40, passes through a gas-flow measuring device 41 and a purifier 42 in which any oxygen $O_2$ contained in the hydrogen is combined with it in a part 43 to form water, which is subsequently received in a container 44 filled with liquid nitrogen and enters tube 4 at its upper side. Subsequently, the molecular hydrogen circulates through the tubes 4 and 1 of device A in the direction indicated by an arrow in FIGURE 1.

If an electric voltage is applied between the conductors 8 and 9 so as to produce a discharge between the electrodes 10 and 11, the reaction of the hydrogen, partly activated by the discharge, with the phosphorus 7 results in phosphine $PH_3$ which is entrailed with the remaining hydrogen in the direction indicated by arrow 19.

The gas flow composed of hydrogen and phosphine then reaches the floating-zone-melting device B in which the phosphine is dissociated due to the temperature prevailing near the molten zone of silicon, the isolated phosphorus penetrating the molten silicon and thus activating it.

It was experimentally shown that, if no electric discharge occurs between the electrodes 10 and 11 (and the remaining operating conditions of the device of FIGURE 1 remain unchanged) the specific resistance of the silicon does not decrease. The absence of phosphorus in the silicon shows that no $PH_3$ has been formed by reaction of the hydrogen with the phosphorus 7.

If, however, an electrical discharge between the electrode 10 and 11 is produced, the specific resistance of the silicon decreases due to the dissociation of the $PH_3$ produced.

Consequently, $PH_3$ is obtained from the dissociation of hydrogen molecules into more active atoms and ions which are led by the flow of hydrogen to the pulverulent phosphorus 7 and enter into reaction with it.

The amount of $PH_3$ produced is larger, the higher the extent of the activation, that is to say of the dissociation and/or ionization of the hydrogen at the moment of contacting the phosphorus. This extent may be increased, for example, by decreasing the distance between the place of the electrical discharge and the place where the hydrogen contacts the prosphorus. In the device A shown in FIGURE 1, said distance may be readily adjusted by manually displacing tube 4 in the stopper 5. It is possible to provide for tube 4 to carry an index indicating directly the distance in millimetres on a graduation. Such a measuring arrangement is known per se and not shown. It is alternatively possible for tube 4 to be provided, for example, with a toothed rod and a gear wheel controlled by a crank for the purpose of facilitating an exact control of the distance desired. Such a regulating arrangement known per se is neither shown, but is evident.

It was shown experimentally that the specific resistance of the silicon actually decreases by reducing said distance. Thus, an increase in the amount of phosphorus penetrating the silicon results due to larger amounts of $PH_3$ produced, which are carried by the remaining hydrogen to the silicon in the device for floating zone-melting. From this ensues the possibility of controlling, by control of the extent of the activation of the hydrogen, the amounts of $PH_3$ produced and also of the phosphorus resulting from the dissociated of the $PH_3$ and participating in the activation of the silicon.

Several results obtained with the device shown in the figures now follow by way of example.

Each of the two tungsten electrodes 10 and 11 has a surface area of 2 x 2 sq. mm. and the distance between them is 4 mm. The limb 2 of tube 1 has an internal diameter of 35 mm. and the pulverulent red phosphorus layer 7 has a weight of 600 mg. The pressure prevailing in the tubes is equal to the atmospheric pressure and the thermostatic liquid is glycerin which is maintained at 35° C.

The device B requires to be purified prior to use. For this purpose a three-way cock 45 having a by-pass line is provided which in actual operation of the device is normally closed towards 32, but is turned during the purifying process. Subsequently, the cock 45 is closed towards 32 and the flow of hydrogen is led through the device A, but without formation of a spark, followed by heating to 150° C. for a full day while maintaining the flow of hydrogen. The purification has been formed sufficient, as may be proved by treatment of a silicon rod having a known specific resistance, but without the formation of a spark. The specific resistance of this rod except for the segregation of impurities initially present must not have changed. After the purification one proceeds to the activation. The results obtained with several runs using n-type silicon rods having specific resistances of 20 ohms cm., a hydrogen supply of 2 litres/min., a pulling velocity of 1.2 mm./min., red phosphorus of 98% to 99% purity and providing the spark at different distances from the phosphorus in different runs are as follows:

| Distance spark phosphorus | Specific resistance of the silicon obtained, ohms-cm. | Type |
|---|---|---|
| 12 cm | 4 –15 | n |
| 1 cm | 0.6– 0.7 | n |
| 2 mm | 0.3 | n |

It should be noted that, in the presence of the spark the resistivity noticeably decreases and to an even higher extent if the distance between the arc and the phosphorus is reduced. The amount of impurities introduced into the rod being treated increases with an increase in the number of activated hydrogen atoms or ions contacting the phosphorus. This proves the reality of the activity of the doper hydrogen on the phosphorus under the conditions chosen.

The present example thus provides a method of activation in the gaseous phase which permits the manufacture of phosphorus-activated crystals of a resistance chosen preliminarily.

The substance entering into reaction with the activated gas may also be gaseous or liquid. In the first case it is introduced in suitable amounts at the same time as the other gas and may preferably have been activated too. In the second case the activated gas may react with the liquid substance by bubbling through it or leading over it.

The invention is applicable, as previously mentioned, to the manufacture of chemical compounds other than $PH_3$, for example to the manufacture of other volatile hydrides, such as hydrides of arsenic, antimony or boron for activating silicon and germanium, hydrides of sulphur, selenium and tellurium for activating semi-conductors of type $A^{III}B^V$, hydrochloride for activating semiconducting sulphides, selenides and tellurides (for example of cadmium or lead), and hydrides of silicon, germanium and selenium for producing thin semi-conductor layers by dissociation of the hydrides.

The use of the invention is not limited to the example above described and more particularly the extent of dissociation and/or ionization of the hydrogen may be increased, for example either by increasing the distance between the electrodes 10 and 11 and a corresponding increase of the breakdown voltage appliedto the electrodes, resulting in an increased number of the dissociated hydrogen molecules, or by reducing the pressure in the interior of the tubes 4 and 1, resulting in an increased lifetime of the isolated hydrogen atoms or ions.

What is claimed is:

1. A method of controlling the rate of activation of a semiconductor comprising the steps, passing hydrogen into an activation zone wherein the hydrogen is preactivated, causing said preactivated hydrogen to leave and move away from said activation zone thereby allowing a portion of said preactivated hydrogen to become unactivated, the proportion of unactivated hydrogen to preactivated hydrogen being proportional to the distance from said activation zone, at a distance wherein a desired ratio of preactivated to unactivated hydrogen occurs bringing said mixture of preactivated and unactivated hydrogen into contact with an element reactive with preactivated hydrogen to form a gaseous hydride to thereby form a mixture of a gaseous hydride and unactivated hydrogen in a desired ratio, bringing said mixture of gaseous hydride and unactivated hydrogen into contact with a semiconductor, the surfaces of said semiconductor being at a temperature sufficiently high to cause said gaseous hydride to disassociate into said element and hydrogen while in contact with the semiconductor and thereby activate said semiconductor with a controlled amount of said element.

2. The method of claim 1 wherein the semiconductor is selected from the group consisting of germanium and silicon and the hydride is selected from the group consisting of the hydrides of phosphorus, arsenic, antimony and boron.

3. The method of claim 1 wherein the semiconductor is of the type $A^{III}B^V$ and the hydride is selected from the group consisting of the hydrides of sulfur and selenium.

4. Apparatus for the activating of a semiconductor with a predetermined amount of an activating element, said apparatus comprising in combination flow means for passing hydrogen into contact with an electrical discharge producing means for activating said hydrogen, said electrical discharge means comprising a plurality of electrodes, flow means for bringing said activated hydrogen into contact with an element capable of forming a gaseous hydride, with said activated hydrogen, means for adjusting the positions of said plurality of electrodes and said element relative to each other and flow means for bringing said gaseous hydride into contact with a semiconductor at least the surfaces of which are heated to a temperature high enough to cause the hydride to decompose into hydrogen and said element while in contact with said semiconductor.

5. Apparatus for use in controlled gas state reactions, said apparatus comprising, in combination, flow means for passing a gaseous material into contact with an electrical discharge producing means for activating said gaseous material, said electrical discharge means comprising a plurality of electrodes, flow means for bringing the resultant activated gaseous material into contact with a substance chemically reactive with said activated gaseous material, means for adjusting the positions, relative to each other, of said plurality of electrodes and the substance chemically reactive with said activated gaseous material and a flow means for withdrawing the resultant gaseous material from the area of contact between the activated gaseous material and the substance chemically reactive with said activated material.

References Cited

UNITED STATES PATENTS

| | | | |
|---|---|---|---|
| 1,489,724 | 4/1924 | Wendt | 204—165 |
| 2,768,061 | 10/1956 | Cook et al. | 204—164 |
| 2,910,394 | 10/1959 | Scott et al. | 148—1.5 |
| 3,170,859 | 2/1965 | Boudart et al. | 204—157 |

OTHER REFERENCES

Glockler et al.: "The Electrochemistry of Gases and Other Dielectrics" (1939), pp. 118–120.

HOWARD S. WILLIAMS, *Primary Examiner.*

JOHN R. SPECK, JOHN H. MACK, WINSTON A. DOUGLAS, *Assistant Examiners.*